United States Patent Office 2,754,352
Patented July 10, 1956

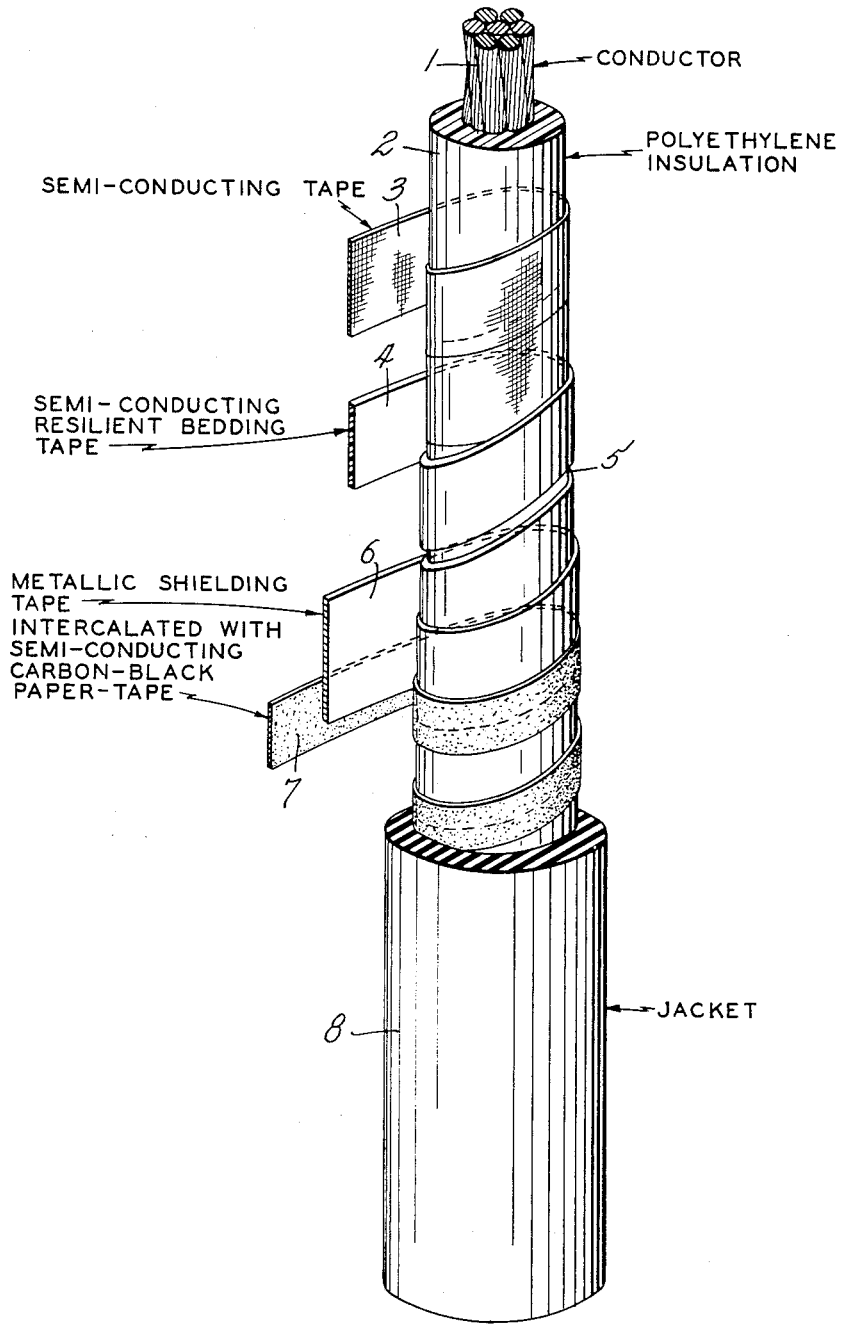

2,754,352

SHIELDED ELECTRIC POWER CABLE

Amos Clarendon Connell, Hastings-on-Hudson, N. Y., assignor to Anaconda Wire and Cable Company, a corporation of Delaware Application April 2, 1952, Serial No. 279,993

7 Claims. (Cl. 174—107)

This invention relates to electric power cables, and is concerned especially with shielded electric power cables making use of polyethylene as an insulation material. It is a particular object of the invention to minimize the imposition of tensile or hoop stress on the shield due to thermal expansion of the polyethylene insulation. To this end the new cable includes a cushioning layer of elastically resilient material on which the shielding conductor is bedded, whereby any substantial thermal expansion of the polyethylene is accommodated without risk of damage to the shielding conductor.

Polyethylene is a semi-rigid, waxy, translucent synthetic resin having excellent dielectric properties, ozone resistance, moisture resistance and chemical stability. It has been used extensively in recent years for insulating high-frequency conductors which normally carry only small currents. Although it possesses excellent physical, chemical and electrical properties as an insulating material for high voltage power cables which carry relatively large currents, its use for this purpose has been limited due to its extremely high coefficient of thermal expansion. For example, the volumetric expansion of polyethylene when its temperature increases from 20° C. to 80° C. is approximately 4%. In power cables an operating range of temperature of such magnitude is not unusual. The expansion of the polyethylene which occurs as the temperature increases imposes so great a hoop or tensile stress on the conventional metallic shield tape as to cause it to rupture, or to stretch so that it becomes loose, and thereby impairs or even destroys its shielding effect.

I have discovered that power cables making use of polyethylene insulation can be manufactured and operated within the usual range of temperature limits without damage to a metallic shield layer by applying a cushioning layer of elastically resilient bedding material (such as a tape of chloroprene or other elastomer) between the polyethylene insulation and the metallic shield. The cushioning layer accommodates and absorbs the thermal expansion of the polyethylene without imposing an excessive tensile or hoop stress on the metal of the shield. Accordingly a cable of the character contemplated by this invention comprises a metallic conductor, a layer of polyethylene insulation surrounding the conductor, a cushioning layer of elastically resilient material surrounding the insulation, and a thin metallic shield snugly applied over said cushioning layer. A protective jacket advantageously surrounds the metallic shield. The resilient material of which the cushioning layer is made preferably is itself electrically conducting in character; and it is in some cases desirable to apply a thin layer of electrically conductive material in close contact about the polyethylene underneath the cushioning layer.

The foregoing and other features of the invention are described in greater detail below with reference to the single figure of the accompanying drawing, which shows an advantageous embodiment of the new cable.

The cable shown in the drawing is a single conductor cable having a central stranded conductor 1 surrounded by a relatively thick insulating layer 2 of polyethylene. Although a single conductor cable is shown for purposes of illustration in the accompanying drawing, it is understood that the invention is equally applicable to a cable having two or more conductors, each of which may be separately insulated by an individual layer of polyethylene, or two or more of which may be embedded in but held spaced apart by a single body of polyethylene insulation.

In order to equalize electrical stresses at the surface of the polyethylene insulation, a thin cloth tape 3 which is rendered electrically conductive by being impregnated with carbon black or other finely divided electrically conducting material, is wrapped helically about the insulation. The cloth tape 3 is thin (generally not more than about 0.005 inch), and preferably is applied with a slight overlap at its edges in order to be sure that the polyethylene insulation is completely covered thereby. The cloth tape 3 is of course very flexible and is itself capable of yielding to such thermal expansion of the polyethylene as occurs during normal use of the cable. In place of the cloth tape 3, some other equivalent conductive layer, such as a thin extruded or otherwise applied layer of electrically conducting flexible plastic material may be used. The layer of cloth tape 3 or its equivalent is not itself an essential part of the cable of this invention, however, and in some cable constructions according to the invention it may be omitted altogether.

Next is applied a relatively thick cushioning layer in the form of a helically wrapped tape 4 of elastically resilient material. An elastomer such as chloroprene, butyl rubber, or a latex preparation, is a particularly satisfactory material of which to make the tape 4; and it is advantageously from 0.010 to 0.025 inch thick—in a typical case it will be say 0.015 inch thick. The tape is preferably applied helically, as shown, with its edges spaced apart slightly to form a helical gap 5 extending the length of the cable. Alternatively the tape 4 may be applied with its edges overlapping, and in such case a gap which extends helically the length of a cable is formed in the region of the overlap. Again, the tape 4 may in some instances be laid on with edges abutting, though it is difficult as a practical matter in commercial production to avoid either a small overlap or a small spacing apart of the edges of the tape.

While the material of which the tape 4 is made may be a conventional non-conducting resilient substance, it is generally preferable for it to be electrically conductive. For this purpose, the elastically resilient material may be compounded to contain a considerable proportion of carbon black, graphite, metal powder, or other finely divided electrical conductor, incorporated in sufficient amount and in such manner to give the cushioning tape the characteristics of a high resistance conductor. By making the tape 4 of electrically conducting material, and particularly when such tape is used in combination with the layer 3 of electrically conductive material closely surrounding the surface of the polyethylene insulation, the development of small zones subjected to high electrical stress in the cable structure beyond the polyethylene insulation is substantially eliminated.

The tape 4 ordinarily is made of a dense substantially non-porous elastically resilient material, such as a typical rolled or extruded tape of elastomer composition. It may in some cases advantageously be of substantial porous or spongy structure, particularly if made of an electrically conductive spongy material. When a tape of spongy structure is employed, it is relatively unimportant that particular attention be paid to the provision of any gap adjacent the edges of the tape.

Helically wrapped about the cushioning tape 4 is a metallic shield tape 6. The tape 6 is frequently of thin gauge copper, but it may equally well be of aluminum or other metal. As shown in the drawing, the metallic shield tape 6 is advantageously intercalated with a paper tape 7 which is impregnated with sufficient carbon black or equivalent material to render it electrically conductive. However, it is not an essential feature of the invention that the paper tape 7 be employed. Neither is it essential, when it is employed, that it be in the form of a separate tape intercalated with the metallic shield tape 6. An alternative and equally satisfactory structure is one in which the metallic shield tape is in the form of a thin metal foil bonded to an electrically conductive paper or equivalent backing material, and when such a tape is used it is simply wrapped on helically with a substantial overlap.

The cable is completed by a protective jacket 8, which may be of electrically non-conducting material such as a rubber composition, polyvinyl chloride, or the like, or which may be of electrically conducting material such as a lead sheath, a steel armor, or the like.

In normal use the polyethylene insulation of the cable structure above-described is subjected to heating and cooling in conformity with variations that occur in the amount of current carried by the conductor 1, and of course with changes in the ambient temperature. Expansion of the polyethylene which occurs with an increase in its temperature is considerably greater than the accompanying thermal expansion of the metallic shield tape 6. However, the expansion of the polyethylene is accommodated by the elastically resilient cushioning tapes 5, which deform sufficiently for such purpose without imposing an excessive tensile force or hoop stress on the shield. In consequence the shielding of the new cable is reliably maintained intact under all normal conditions of use of the cable.

I claim:

1. An electric cable comprising a metallic conductor, a layer of polyethylene insulation of substantial thickness surrounding said conductor, a cushioning layer of electrically conductive elastically resilient material surrounding said polyethylene insulation, and a thin substantially inextensible metallic shield tape snugly applied over said cushioning layer, whereby any substantial thermal expansion of said polyethylene that may occur during normal operation of the cable is accommodated by the elastic resilience of said cushioning layer without imposing an excessive tensile or hoop stress on said shield.

2. An electric cable comprising a metallic conductor, a layer of polyethylene insulation of substantial thickness surrounding said conductor, a cushioning layer of electrically conductive elastically resilient material surrounding said insulation, a thin substantially extensible metallic shield tape wrapped snugly about said cushioning layer, whereby any sustantial thermal expansion of said polyethylene that may occur during normal operation of the cable is accommodated by the elastic resilience of said cushioning layer without imposing an excessive tensile or hoop stress on said shield tape, and a protective jacket surrounding said shield tape.

3. An electric cable comprising a metallic conductor, a layer of polyethylene insulation of substantial thickness surrounding said conductor, a cushioning layer comprising a helical wrapping of elastically resilient tape surrounding said insulation, said wrapping being applied with a helical gap formed adjacent the edges of the tape, and a thin substantially inextensible metallic shield tape snugly applied over said cushioning layer, whereby any substantial thermal expansion of said polyethylene that may occur during normal operation of the cable is accommodated by the elastic resilience of said cushioning layer without imposing an excessive tensile or hoop stress on said shield.

4. A cable according to claim 3 in which the tape of the cushioning layer is made of an electrically conducting elastomer.

5. An electric cable comprising a metallic conductor, a layer of polyethylene insulation of substantial thickness surrounding said conductor, a relatively thin layer of flexible electrically conductive material substantially completely covering the surface of said layer of insulation, a relatively thick cushioning layer of elastically resilient material surrounding said relatively thin layer, and a thin substantially inextensible metallic shield tape snugly applied over said cushioning layer, whereby any substantial thermal expansion of said polyethylene that may occur during normal operation of the cable is accommodated by the elastic resilience of said cushioning layer without imposing an excessive tensile or hoop stress on said shield.

6. An electric cable comprising a metallic conductor, a layer of polyethylene insulation of substantial thickness surrounding said conductor, a wrapping of relatively thin flexible tape of fibrous electrically conductive material substantially completely covering the surface of said layer of insulation, a cushioning layer comprising a relatively thick elastically resilient tape of electrically conductive material applied helically about said first wrapping with a helical gap adjacent the edges thereof extending substantially the full length of the cable, and a thin substantially inextensible metallic shield tape wrapped snugly about said cushioning layer, whereby any substantial thermal expansion of said polyethylene that may occur during normal operation of the cable is accommodated by the elastic resilience of said cushioning layer without imposing an excessive tensile or hoop stress on said shield.

7. An electric cable comprising a metallic conductor, a layer of polyethylene insulation of substantial thickness surrounding said conductor, a tape of spongy structure made of an electrically resilient electrically conductive material and wrapped helically about said insulation, and a thin substantially inextensible metallic shield tape wrapped helically about said cushioning layer, whereby any substantial thermal expansion of said polyethylene insulation that may occur during normal operation of the cable is accommodated by the elastic resilience of said cushioning layer without imposing an excessive tensile or hoop stress on said shield.

References Cited in the file of this patent

UNITED STATES PATENTS

| | | |
|---|---|---|
| 2,322,702 | Peterson | June 22, 1943 |
| 2,446,387 | Peterson | Aug. 3, 1948 |
| 2,591,794 | Ebel | Apr. 8, 1952 |
| 2,597,222 | Bennett | May 20, 1952 |

FOREIGN PATENTS

| | | |
|---|---|---|
| 879,910 | France | Dec. 10, 1942 |
| 601,836 | Great Britain | May 13, 1948 |
| 613,220 | Great Britain | Nov. 24, 1948 |
| 813,848 | Germany | Feb. 18, 1952 |